UNITED STATES PATENT OFFICE.

CARL F. KRIEWS, OF CLEVELAND, OHIO, ASSIGNOR OF ONE-HALF TO FRANK C. KRIEWS, OF CLEVELAND, OHIO.

FLUX FOR SOLDERING ALUMINUM.

1,208,798.  Specification of Letters Patent.  Patented Dec. 19, 1916.

No Drawing.  Application filed February 10, 1916. Serial No. 77,367.

*To all whom it may concern:*

Be it known that I, CARL F. KRIEWS, a citizen of the United States, resident of Cleveland, county of Cuyahoga, and State of Ohio, have invented a new and useful Improvement in Fluxes for Soldering Aluminum, of which the following is a specification, the principle of the invention being herein explained and the best mode in which I have contemplated applying that principle, so as to distinguish it from other inventions.

My invention relates to means for securing solder to aluminum, the object of the invention being to provide a simple, economical and efficient means for accomplishing the above named purpose.

The said invention consists of means hereinafter fully described and particularly set forth in the claims.

As is well known to those skilled in the art at the present time, great difficulty has been met in devising a simple and economical method of soldering aluminum, that is, in causing a suitable solder to become thoroughly and permanently affixed to an aluminum surface. While solder has been heretofore secured to aluminum, it has not, in so far as I am aware, been so done as to make a strong permanent union, as it has been found that in time the joint is apt to break down. I have found, however, that by first treating the aluminum surface with olive oil, the solder may be readily made to adhere to such surface, the process used being similar to that of ordinary soldering but differing therefrom as a result of the use of olive oil as the chief soldering agent.

In using the expression "olive oil," I mean, of course, to include the usual equivalents of olive oil in the present relation, such as linseed, cotton seed, and other similar oils, all being glycerids of one or more fatty acids, such as oleic and linoleic, which are the characteristic fatty acids obtainable from the oils. It is in this sense that I use the expression "glycerid of a fatty acid."

In carrying out my improved process, I first scrape or otherwise clean the aluminum surface to which the solder is to be applied, then apply ordinary olive oil to such surface, after which I apply an ordinary solder, consisting, say, of one-eighth of tin and seven-eighths of lead, by means of a previously heated and ordinary soldering iron, preferably heated to from 475° to 550°. Where a large surface or seam is to be soldered, I prefer to heat the adjoining surfaces slightly, before the application of my process, but where the surface or seam is small, such preheating I find to be unnecessary.

Having thus described my invention, what I claim as new and desire to secure by Letters Patent, is:

1. A flux for soldering aluminum consisting of olive oil.

2. A flux for soldering aluminum consisting of a glycerid of a fatty acid.

Signed by me, this 8th day of February, 1916.

CARL F. KRIEWS.